United States Patent Office 3,364,119
Patented Jan. 16, 1968

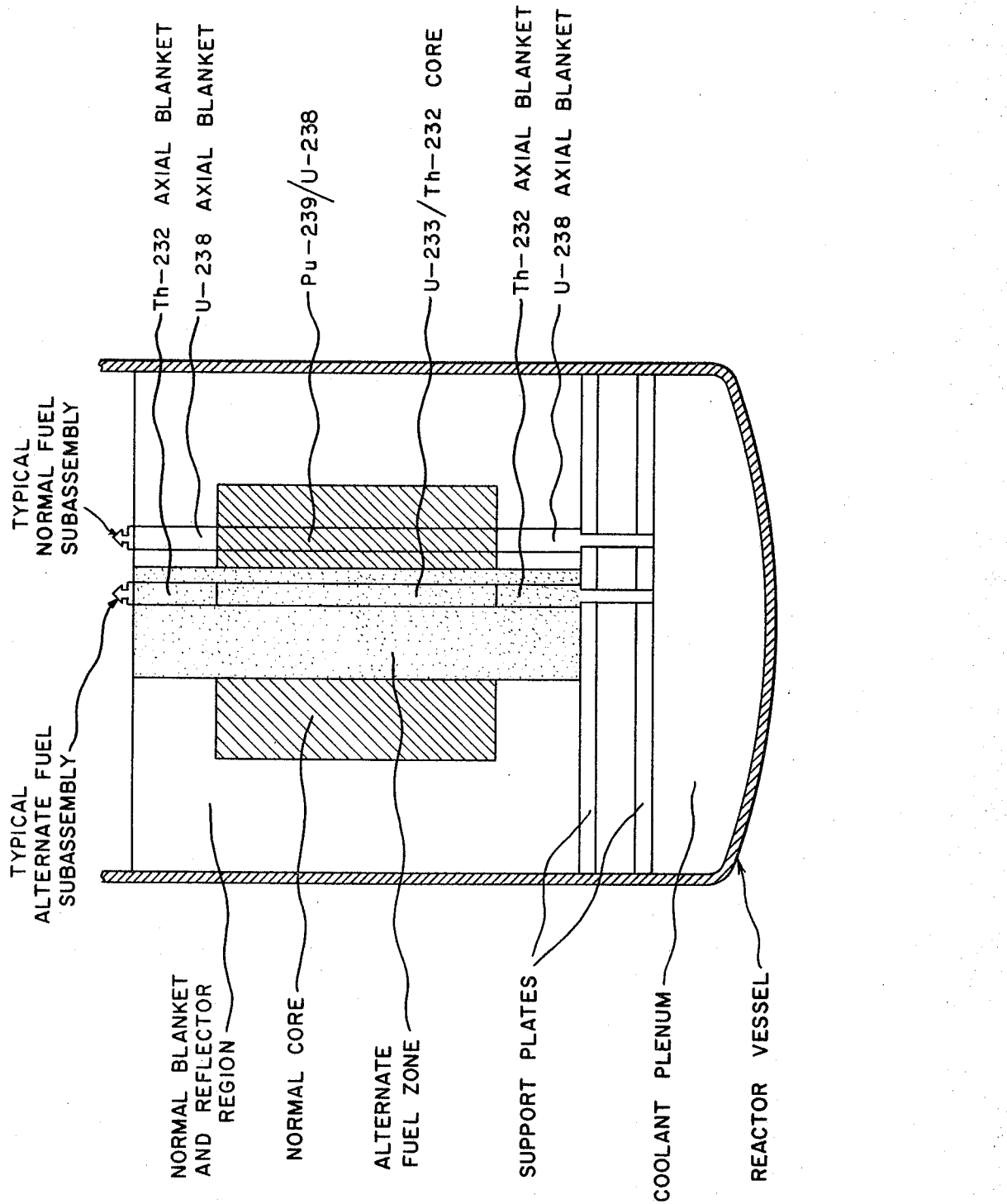

3,364,119
ZONED FUEL FAST REACTORS
John B. Nims, Royal Oak, and Earl M. Page, Madison Heights, Mich., assignors to Atomic Power Development Associates, Inc., Detroit, Mich., a corporation of New York
Filed Oct. 24, 1965, Ser. No. 504,916
3 Claims. (Cl. 176—18)

This invention relates to sodium-cooled or other liquid metal-cooled fast reactor systems and more particularly to the problem of eliminating or minimizing the so-called positive sodium void coefficient which tends to occur with large reactors of that type.

Upon the occurrence of voiding or losses of sodium in the cores of such reactors due to any cause, the result is first a reduction in the moderation effect of the sodium which causes an increase in the neutron energy, and an increased reactivity, tending to establish a so-called positive sodium void coefficient, and secondly, the voiding tends to increase leakage of neutrons from the core regions thereby tending to decrease reactivity and to give rise to a negative void coefficient. But such leakage is essentially an effect which is most pronounced in the outer surface or edges of the core system and is not so significant as to voids which occur in the middle zones of the core. Thus, for small reactors, the leakage effect outweighs the effects due to reducing moderation so that the positive sodium void coefficient problem does not ordinarily occur substantially with such small reactors. But for large reactors conversely, the reduction of the moderation effect may outweigh the leakage effect. Thus, assuming that a small disturbance or accident occurs in a large sodium-cooled reactor, giving rise to voids or greater voids, then, if any substantial tendency toward increased reactivity results, there will be an increase in power generated which results in the voiding problem becoming worse. Although the aforesaid effect of causing reduction in moderation essentially may occur over the whole core, it is much more pronounced in the central regions.

Ordinarily it is preferable that there is a slightly negative sodium void coefficient in such fast reactors, although certain factors may so alter the situation that a somewhat positive coefficient may be tolerated with safety.

The increase in reactivity upon loss of sodium (positive sodium void coefficient) which is characteristic of large advanced sodium-cooled fast reactor systems, presents a problem to the designers of such systems in their effort to select a core configuration which will be satisfactory as to its safety implications. Thus it has been proposed to circumvent this problem with large reactors by selection of a core geometry which will permit high neutron leakage which tends to occur, for example, if the core is shaped like a flat cylinder, or more or less disc-like, or as an annulus, or if a modular core is used containing several loosely-coupled smaller cores of more conventional shape. But such designs inherently possess the disadvantages of a low breeding ratio and high critical mass. The penalties attached to these disadvantages are that the low internal breeding ratio leads to the necessity of a more complex and expensive control system in order to provide a greater amount of reactivity needed for burnup and the larger fuel inventory adds appreciably to the fuel cycle costs. For these reasons, there has been a need for a solution of this positive sodium void coefficient problem which will permit the use of conventional core geometry.

In arriving at alternative solutions of this problem, we have borne in mind that the void coefficient is positive only in the central parts or regions of the core where the neutron leakage component is generally insignificant, such leakage component being negative and dominant in the regions near the core boundaries. Thus, according to one aspect of the present invention, we have made use of the possibility of introducing a local modification of the core composition at the central regions thereof rather than one that extends over the entire core region.

According to the invention of our co-pending Application Ser. No. 504,432, filed Oct. 24, 1966, entitled, "Minimizing the Positive Sodium Void Coefficient in Liquid Metal-Cooled Fast Reactor Systems," the desired result was obtained by introducing the moderator material in the central region of the core.

The present invention provides an alternative solution to the problem essentially by altering the energy dependent characteristics of the neutron worth over the central portion of the core. That is, by using certain alternate fissionable and fertile materials in the inner radial zone of the core where the void coefficient is positive, in large fast reactors of the class here under consideration, this will cause the sodium void coefficient to be much more negative than in a similar reactor which utilizes Pu239 and U238 respectively for the fissionable and fertile materials. These characteristics, as they relate to the sodium void coefficient, may be summarized as follows.

For neutrons with energies greater than about 10 kev. the number of neutrons released per absorption in Pu239 increases with neutron energy and there are substantial increases with energy in the ratio of fission-to-capture cross-section due chiefly to the threshold fission cross-sections of U238 and Pu240. (All systems fueled with Pu239 inherently possess an amount of Pu240 that is usually significant.) Below 10 kev., the cross sections of the mixture are such that there is an increase in the fission-to-capture ratio with decreasing neutron energy. Thus the slowing down of neutrons (neutron moderation) in the energy range above approximately 10 kev., produces a negative reactivity change, while slowing down at lower energies causing a positive change. In the usual fast reactor designs, the neutron flux peaks at an energy of about 200 kev., and thus the reduction in neutron moderation accompanying the voiding of sodium, produces a positive component in the sodium void effect.

It has been determined that the use of certain alternate fissionable and fertile materials, such as U233 and Th232, would reduce this positive component of the sodium void coefficient. This reduction is due to the fact that the threshold fission cross-section of Th232 is smaller than that for U238 and Pu240, and it occurs at a higher neutron energy. Also, the variation with energy in the number of neutrons per absorption in U233 is less as compared to Pu239.

Further aspects, features and advantages of the invention will more clearly appear from the following description, taken in connection with the accompanying drawing, which is a schematic diagram of a reactor embodying the invention, and showing various typical parts and regions as in vertical cross-section.

Referring to this diagram in further detail, it will be noted that there is here shown a reactor vessel having a normal core region (at the cross-hatched areas) which has a compact form of geometry. Within the central or middle portions of this core region, there is indicated by stippled areas, an alternate fuel zone in accordance with the invention. The core region around its sides, and above and below, is surrounded by a normal blanket and reflector region which may be of a suitable type conventional for this class of reactor. A typical one of the normal fuel subassemblies is here indicated as extending from the top of the blanket region down through the normal core region, through the lower blanket region, and to suitable supporting plates. It will be understood that this is merely a schematic showing of one of these typical normal fuel subassemblies, of which there would be a large number in the complete reactor. The upper and lower portions of these normal fuel subassemblies may (as shown) contain U238, whereas the middle portions which pass through the core region contain Pu/U. Also there is here shown a typical one of the alternate types of fuel subassemblies extending from the top down to the supporting plates in the reactor, and it will be understood that there will be a considerable number of these alternate type subassemblies extending down through the "alternate fuel zone." The middle portions of these alternate subassemblies which are located within the alternate fuel zone, will contain U233/Th232. The upper and lower portions of these alternate subassemblies which extend into the blanket regions, are to contain Th232, as noted in the schematic drawings.

While previous investigations have involved consideration of the use of such alternate fuel materials uniformly over the core, with the present invention, however, the subassemblies containing the alternate materials are to be loaded only into the central zone of the core, which zone, as to size, is determined so as to reduce the sodium void coefficient to a safe and acceptable magnitude. Generally such central zone need occupy only about 25% of the core. The system can, therefore, operate principally in the Pu/U cycle. By keeping the alternate materials in the separate subassemblies, the possibilities of mixing the two material systems may readily be avoided in the fuel processing streams. It may be desirable, and also possible, to design the reactor loading so that the system will breed its own requirements of the alternate fissionable material, as well as breeding on the Pu/U cycle.

In a typical case, the fuel-pin portions or elements within the alternate fuel zone above referred to, may embody 12–20% of U233 and 80–88% of Th232.

We have analyzed this method of zoned fueling for a 2000 liter spherical core containing $PuO_2/UO_2$ as its primary system and $U233\ O_2/ThO_2$ as the alternate fuel. The alternate fuel occupied the central 25% of the core. Multigroup analysis incorporating perturbation theory indicates that this technique reduces the sodium void coefficient for the total core from a positive value of $4.77 to a negative value of $−1.00. The coefficient for the central 25% of the core was reduced from a positive value of $4.42 to a negative value of $−.08.

The decrease in breeding ratio in the inner zone resulting from the lower density of $ThO_2$ as compared with $PuO_2$ can be alleviated through tailored design concepts.

The enrichment of the Th–U zone can be made smaller than the outer Pu–U zone. Second, the fuel atom density in the inner zone can be increased by using metallic Th–U while maintaining the oxide outer zone. Preliminary burnup studies have revealed encouraging burnup properties of Th–U alloys.

While the invention has been particularly described with reference to large sodium-cooled fast nuclear reactors, it will be understood that various aspects of the invention may be applicable to fast nuclear reactors which are liquid-cooled other than by sodium, and accordingly this disclosure and the appended claims should be construed in the light of that fact.

Although particular embodiments of the invention are disclosed herein for purposes of explanation, various modifications thereof, after study of this specification, will be apparent to those skilled in the art to which this invention relates. Reference should accordingly be had to the appended claims in determining the scope of the invention.

What is claimed and desired to be secured by Letters Patent is:

1. A large sodium-metal cooled fast nuclear reactor having a core comprising a medial region and an outer region, said outer region having a plurality of Pu239 and U238 fuel elements, and said medial region having a substantial proportion of spaced U233 and Th232 fuel elements for reducing the sensitivity of the reactivity to the loss of sodium moderator, said outer region containing substantially no U233 and Th232, the total of said fuel elements being sufficient for sustaining a fast nuclear chain reaction, said middle regions comprising about 25% of the volume of the core.

2. A large sodium-metal cooled fast nuclear reactor having a core comprising a medial region and an outer region, said outer region having a plurality of Pu239 and U238 fuel elements, and said medial region having a substantial proportion of spaced U233 and Th232 fuel elements for reducing the sensitivity of the reactivity to the loss of sodium moderator, said outer region containing substantially no U233 and Th232, the total of said fuel elements being sufficient for sustaining a fast nuclear chain reaction, said U233 comprises about 12 to about 20% and said Th232 comprises about 80 to 88%.

3. A large sodium-metal cooled fast nuclear reactor having a core comprising a medial region and an outer region, said outer region having a plurality of Pu239 and U238 fuel elements, and said medial region having a substantial proportion of spaced U233 and Th232 fuel elements for reducing the sensitivity of the reactivity to the loss of sodium moderator, said outer region containing substantially no U233 and Th232, the total of said fuel elements being sufficient for sustaining a fast nuclear chain reaction, said fuels in the outer regions and said fuels in the middle regions respectively are contained in separate fuel sub-assemblies, said fuel elements are vertically disposed and each extends through an upper axial blanket portion, a core portion, a lower axial blanket portion, and wherein said Pu239 and U238 fuel elements have upper and lower blanket portions of U238 and wherein said U233 and Th232 fuel elements have upper and lower blanket portions of Th232.

References Cited

UNITED STATES PATENTS

| | | | |
|---|---|---|---|
| 2,993,850 | 7/1961 | Soodak et al. | 176—17 |
| 3,140,234 | 7/1964 | Loewenstein | 176—17 |
| 3,260,649 | 7/1966 | Jens et al. | 176—40 |

REUBEN EPSTEIN, *Primary Examiner.*